United States Patent

[11] 3,552,397

[72] Inventor Harrison Greenough
Gearhart, Oreg.
[21] Appl. No. 787,305
[22] Filed Dec. 23, 1968
[45] Patented Jan. 5, 1971
[73] Assignee E. H. Carruthers Company
Warrenton, Oreg.
a corporation of Oregon
Continuation of application Ser. No.
561,148, June 28, 1966, now abandoned

[54] MACHINE FOR REMOVING EDIBLE SPROUTS FROM A BRUSSELS SPROUTS STALK
6 Claims, 8 Drawing Figs.

[52] U.S. Cl. 130/30
[51] Int. Cl. A01d
[50] Field of Search 130/9.1, 9.2, 30, 30A

[56] References Cited

UNITED STATES PATENTS

| | | | |
|---|---|---|---|
| 2,424,241 | 7/1947 | Kerr | 130/9.2 |
| 3,175,561 | 3/1965 | Oldershaw | 130/9.2 |
| 3,252,463 | 5/1966 | Alpen | 130/30 |

*Primary Examiner*—Antonio F. Guida
*Attorney*—Schovee & Boston

ABSTRACT: A method and apparatus for removing sprouts from a Brussels sprouts stalk including rotating knife means defining a central opening through which the stalk of the plant is fed as the knife means cut off the sprouts. Each knife is spaced from the stalk by a stalk guide cutting through the semihard bark and riding on the hard woody shell of the stalk. The knives are held at an angle to the stalk axis to cut off the sprouts in a plane tangent to the sprouts and perpendicular to the centerline of the pedicel.

INVENTOR.
HARRISON GREENOUGH
BY

INVENTOR.
HARRISON GREENOUGH
BY

INVENTOR
HARRISON GREENOUGH
BY
[signature]

INVENTOR.
HARRISON GREENOUGH
BY
Thomson & Lehman

MACHINE FOR REMOVING EDIBLE SPROUTS FROM A BRUSSELS SPROUTS STALK

CROSS-REFERENCE TO RELATED APPLICATIONS

This application is a Continuation-in-Part of my copending application Ser. No. 561,148 filed on Jun. 28, 1966, now abandoned same title as this application.

BACKGROUND OF THE INVENTION

This invention relates to a method and a machine for removing the edible sprouts from the stalks of whole Brussels sprouts plants from which the leaves have been previously removed and which have been severed from the ground at the base of its stalk.

DESCRIPTION OF THE PRIOR ART

While some effort has been made to mechanize the removal of sprouts from whole Brussels sprouts plants, so far as I am aware, the machines have not been completely successful. The removal of sprouts from the stalks has been, for many years, a hand operation. This is, and has been done, by stripping the sprouts from the stalk by hand with a ring type severing tool or a tool similar to an ordinary putty knife followed by a finishing operation to remove the slight portion of the pedicel left on the sprout after cutting from the stalk.

An object of my invention is to provide a method and machine for removing sprouts from whole Brussels sprouts stalks and to provide a method and machine which is efficient in operation, low in production costs, and high in productivity.

Another object of my invention is to feed a cutting assembly and the stalk with the Brussels sprouts thereon, relative to each other, the cutting assembly being rotatable relative to the sprouts, the pedicels of the sprouts, as the stalk and the knives are moved relative to each, being cut smoothly and, the sprouts, with a minimum of subsequent hand operations, being packaged for sale.

Another object of my invention is to hold the sprouts on the stalk by resilient means while cutting the pedicels by a series of cuts extending at an acute angle to the axis of the stalk until the pedicel is finally severed so that the sprouts will drop off by gravity without damage to the sprouts and at a high rate of production.

A further object of my invention is to provide a method and machine wherein the cutting knives for severing the sprouts from the stalk are spring mounted and are held in variably spaced relation, determined by the diameter of the hard woody shell of the stalk, so that the knives are spaced from the stalk; the knives extend at an acute angle to the stalk whereby a series of cuts are made in the pedicel until final severance occurs in a plane tangent to the sprouts and perpendicular to the centerline of the pedicel.

SUMMARY OF THE INVENTION

My invention further contemplates a method and machine for automatically cutting or removing sprouts from a Brussels sprouts stalk preferably from which the leaves have been removed, wherein the stalk is fed relative to a series of knives rotating at a high rotational speed relative to the feed of the stalk, the knives being: (1) spaced from the stalk by means of stalk guides which cut through the soft or semihard bark and which ride on or follow the hard woody shell of the stalk; and (2) held at an acute angle to the stalk whereby the last cut in the pedicel which produces severance of a sprout is substantially tangent to the sprout and substantially perpendicular to the centerline of the pedicel.

BRIEF DESCRIPTION OF THE DRAWINGS

Other objects and advantages of this invention will be more fully understood from the following description, when read in conjunction with the accompanying drawings, in which:

FIG. 3 is an enlarged, cross-sectional view through a portion of FIG. 3;

DETAILED DESCRIPTION OF THE PREFERRED EMBODIMENT

Figure 2:
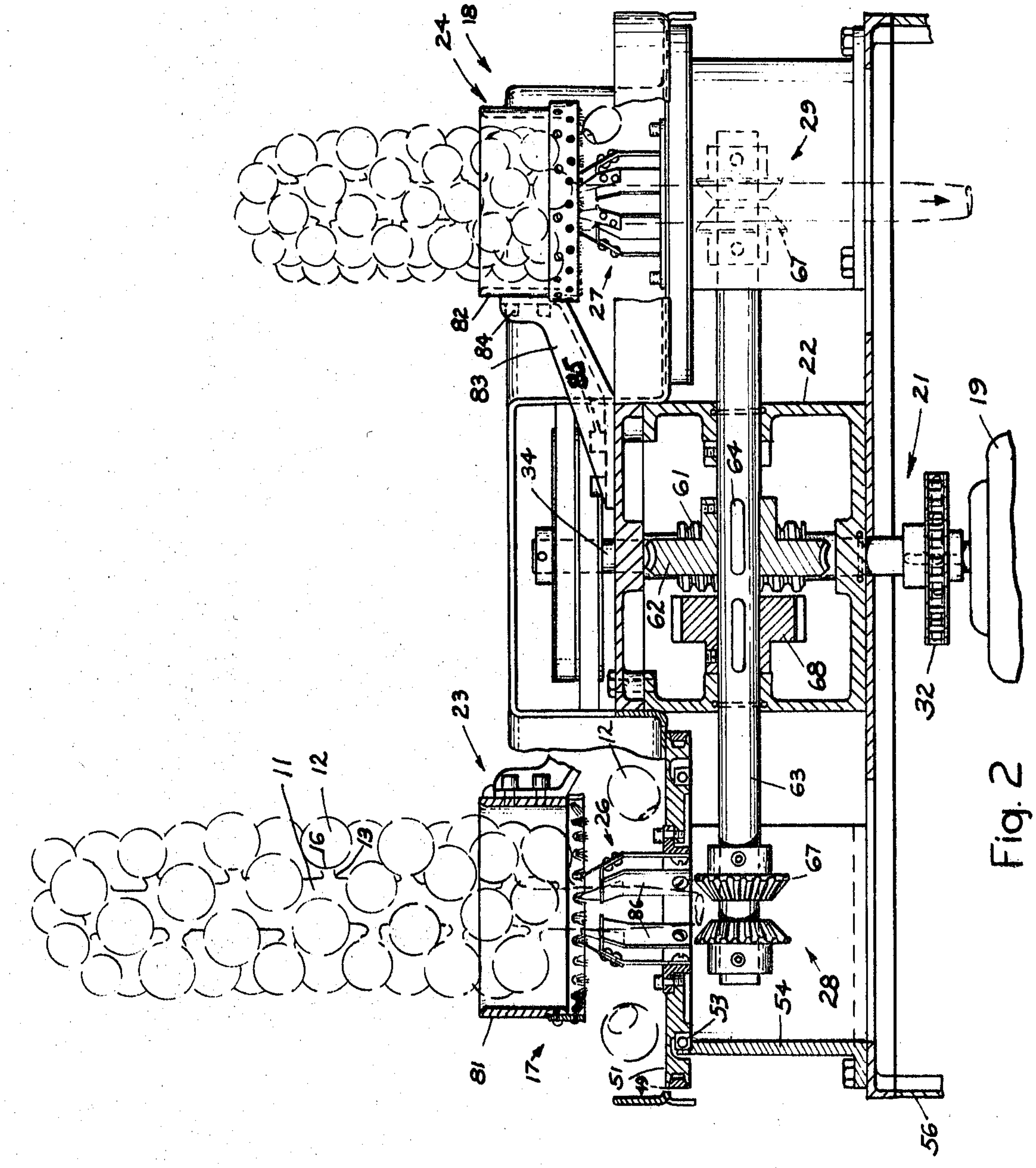
FIG. 2 is a sectional view taken substantially on line 2–2 of FIG. 1 in the direction indicated by the arrows.

Brussels sprouts, as shown in FIG. 2 grow on a stem or stalk 11, the lower end of the stalk being cut from the ground just above the level thereof. Stalk 11 is rather woody or pulpy in character and comprises (see FIG. 3A): (1 1) a soft or semihard outer layer or bark 2, having an irregular outer surface 3; (2) a cylindrical hard woody shell 4 just inside of the bark 2, the shell 4 does not follow the irregularities of surface 3 but rather presents a relatively smooth cylindrical surface 5; and (3) a softer pith core 6 inside of the shell 4. The sprouts 12 are connected to the stalk 11 by a pedicel or branch 13. The pedicels extend from the stalk at an acute angle (toward the top of the stalk) to the longitudinal axis of the stalk. Although I have shown in FIG. 2 a stalk which is relatively straight, it will be appreciated that this is not always the case. My machine for removing the sprouts from the stalk is adaptable to accommodate stalks which are not straight longitudinally thereof.

A further factor adding to the problems encountered in the machine removal of sprouts from their stalks, lies in the facts that even Brussels sprouts plants grown in the same field: vary in height; in diameter of the stalks or stems; in the lengths of the pedicels; and in the diameter of the sprouts. Partly solving these problems, I contemplate a machine having four cutter heads, the dimensions of which are such as to accommodate four different general sizes of sprouts plants. In the drawings I have shown two such heads, 17 and 18, and it will be appreciated that three or more heads could be provided so that various ranges of sizes of Brussels sprouts plants can be accommodated. Head 17 at the left (see FIG. 2) accommodates large stalks; while head 18 at the right is adapted to accommodate plants of somewhat smaller size. The plants are manually classified as to size, the larger plants being fed to the head 17 while the smaller plants are fed to the head 18. As will be apparent from the description which follows, each of the heads is adapted to accommodate a small range of sizes of Brussels sprouts plants.

Figure 6:
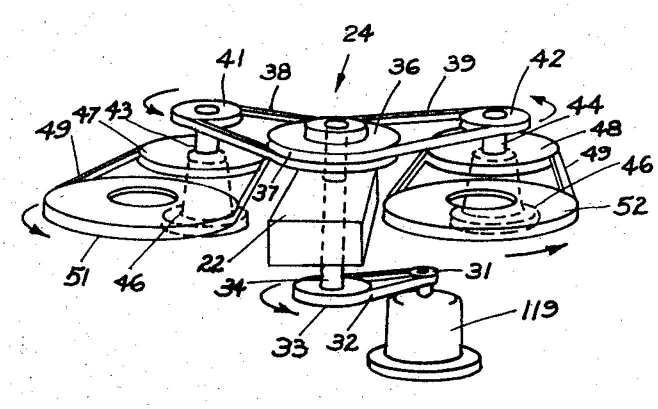
FIG. 6 is a perspective view showing the drive for the machine.

The machine (FIG. 2) by which the method of my invention is carried out, generally comprises a motor 19, a drive generally indicated by the numeral 21, a part of which is enclosed within a housing 22 (see also FIG. 6), the before mentioned heads 17 and 18 which include guide rings, generally indicated by the numerals 23 and 24, cutter assemblies, generally indicated by the numerals 26 and 27, and stalk feeding means generally indicated by the numerals 28 and 29.

The drive, generally indicated by the numeral 21, includes the motor 19, a sprocket 31 mounted on the motor shaft, a chain 32 and a sprocket 33 mounted on the lower end of a vertically extending shaft 34. Shaft 34 extends through the gear box or housing 22 and has mounted on the upper end thereof a pulley 36 having two V-belt receiving grooves 37. Pulley 36 receives the V-belts 38 and 39 which drive pulleys 41 and 42. The pulleys 41 and 42 drive shafts 43 and 44 mounted in bearing supports 46.

Rotatable with the shafts 43 and 44 are pulleys 47 and 48 adapted to receive V-belts 49 which drive special pulleys 51 and 52. The special pulleys 51 and 52 (FIG. 2) are mounted in bearings 53 which are carried by partial cylindrical supports 54 mounted on a base 56. Base 56 may be suitably mounted on the floor at a sufficient height to accommodate the motor 19. Special pulleys 51 and 52 drive the knife or cutting assemblies 26 and 27. Mounted on a shaft 34 which extends through the gear box or housing 22 is a worm 61 which drives a worm wheel 62 mounted on a cross shaft 63 (FIG. 1) keyed as shown at 64 to the shaft.

Mounted on the shaft 63 at each end thereof are a pair of pulling elements for the stalk which have been generally referred to as 28 and 29. These pulling elements are fixed to the shaft, and may take any suitable form, such as toothed or spiked elements, which will grip the stalk and positively hold it and pull it through the machine as the motor is rotated to feed the stalk with the sprouts thereon downward through the cutter knives assemblies 26 and 27. In the particular showing I have shown on each end of the shaft, a pair of mitre gears 67 which face in opposite directions, the teeth thereof digging into the stalk so as to positively grip it.

Mounted on the shaft 63 is a spur gear 68 which is keyed thereto and drives a gear 71 mounted on a shaft 72 and secured thereto in any suitable manner. The shaft 72 drives another set of mitre gears which have been shown in FIG. 2 and are indicated by the numeral 67. Thus, as shown in dotted lines, the stalk is embraced on four sides by the pulling means or mitre gears which dig into the stalk and, as the gears are rotated, positively pull the stalk through the head.

Guide rings 23 and 24 comprise cylindrical members 81 and 82 which as shown at the right of FIG. 2 are supported by support arms or brackets 83 to which the guide rings are bolted as indicated at 84. The support arm 83 is bolted as shown at 85 to the housing 22. The guide rings 23 and 24 are of different diameters as will appear from FIG. 2 to accommodate plants of different sizes. The plants are manually guided into the rings, the lower ends of the stalks being pushed downward sufficiently far to be gripped by the stalk feeding means 28 and 29 which are continuously rotating as long as the motor 19 is in operation. The stalks are immediately gripped by the mitre gears and pulled downward through the machine past the cutter heads 26 and 27. Should the stalks be out of vertical alignment the plants may rest freely in the guide rings and be positioned by stalk guides 89 as feeding of the stalks progresses.

Figures 3, 3A, 4, 5:
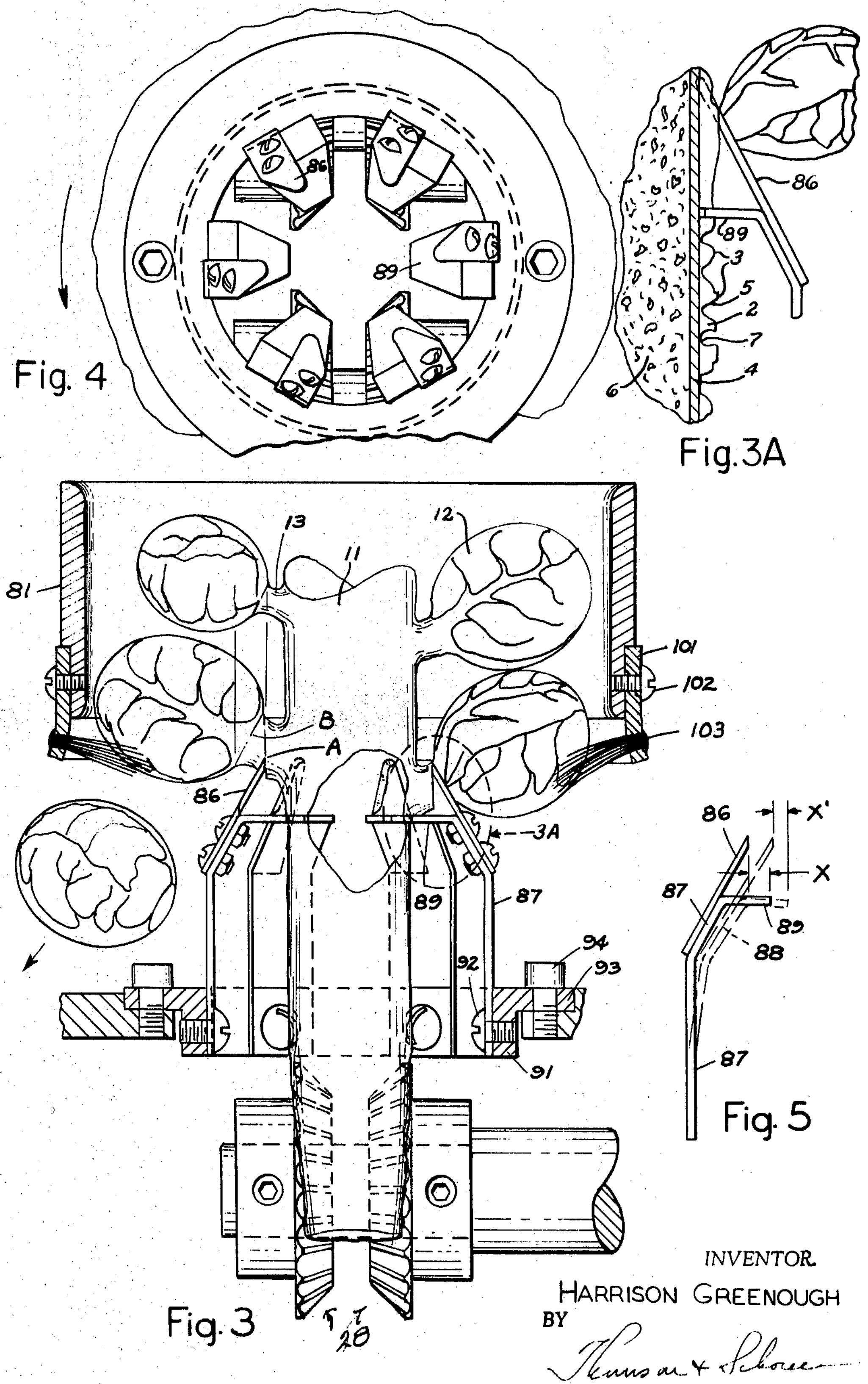
FIG. 3 is a view of a portion of FIG. 2 on an enlarged scale and partly in section illustrating how the pedicel of the individual sprouts is cut and finally severed.
FIG. 4 is a top plan view of one of the cutter heads.
FIG. 5 is a view showing one of the cutter knives illustrating the resilient mounting thereof and the approximate movement thereof as dictated by gauges associated with the knives which are in engagement with the hard woody shell of the stalk.

The cutter heads 26 and 27 comprise a multiplicity of cutter knives 86 (see also FIG. 5) in this case six in number as shown in FIG. 4. Each of the cutter knives 86 may be welded or otherwise secured to a support 87 as by the bolts shown. The knives extend at an angle to the axis of rotation of the cutting head. The knives 86 are positioned at that angle to the axis of rotation of the cutting head that will make the knives cut through the pedicels in planes perpendicular to the centerline of the pedicel. The angle the pedicel makes with the stalk depends upon the variety of sprout, and the angle varies somewhat on any given plant. It has been found in actual practice that an angle of about 15° is preferred for the Jade Cross variety of sprouts and that an angle of about 20—25° is preferred for the Dutch hybrid variety of sprouts. The knives are preferably ground on their inner sides at their leading edge as experiments have shown that this produces a smoother cut, because with the sprout on the flat side of the knife there is no pushing out by the bevel as the knife cuts through the pedicel. Although flat knives are used for practical reasons, they cut cleanly because they are relatively narrow.

Supports 87 are of spring steel and are normally biased inward to the dotted line position shown at 88 in FIG. 5. Each of the supports 87 has an inwardly extending part 89 which constitutes a stalk guide. The stalk guides 89 are preferably six in number and encircle, and are spring pressed against the stalk. The cutter heads 26 and 27 rotate and the stalk is fed in a downward direction as viewed in FIG. 3.

The manner in which the stalk guides 89 maintain the knives 86 correctly spaced from the stalk will now be described with reference to FIG. 3A. The details of FIG. 3A were not included in FIG. 3 in the interests of clarity and ease of understanding. FIG. 3 shows many of the features and operating characteristics of the present invention and FIG. 3 would be too confusing if all of the details shown in FIG. 3A were also included. It should be noted that FIG. 3A correctly shows the manner of operation of the stalk guides; the showing in FIG. 3, as to this feature, is understood as being diagrammatic only.

The stalk guides 89 cut through the pulpy outer wall or bark 2 of the stalk and ride on, or follow the substantially smooth cylindrical outer surface 5 of the hard, woody shell 4 of the stalk. The rotating knives are thus maintained substantially concentric with the hard, woody shell 4 of the stalk 11. Inside of the shell 4 is the soft pith core of the stalk 11. The irregularities in the surface 3 of the semihard bark 2 are cut through by the stalk guides 89, such irregularities include the stumps of previously cut pedicels. This operation is somewhat like a lathe operation, although no attempt is made to create a true tool bit. However, in actual practice, definite shallow lead spiral marking or grooves 7 can be observed around processed stalks and passing through each pedicel stump; and these grooves 7 are quite uniform throughout the stalk. The stalks, of course, are discarded, and their appearance is of no importance; their appearance is described only because the above-mentioned uniformity makes it more clear why the sprouts are cut uniformly.

The supports 87, are springs, biased inwardly, thus enabling the cutter knives 86 to shift laterally with respect to the centerline of the stalk. The length of the pedicel is somewhat in proportion to the diameter of the stalk. For reference, a pedicel adjacent the bottom of a plant will average three-fourths of an inch in length and the stalk diameter of an average size plant will be about 1⅜ inches to 1½ inches in diameter at the bottom and 1⅛ inches in diameter at the top. When the stalk guide 89 moves radially inwardly, as the diameter of the stalk 11 decreases, the larger distance $x$ decreases to the smaller distance $x'$ to take into account the correspondingly shorter pedicel, as shown in FIG. 5. The distance $x$ in FIG. 5 is preferably about one-sixteenth of an inch to one-eighth of an inch.

The supports 87 are carried by an annular ring 91 and are held in position by screws 92. The annular ring 91 has an angular shoulder 93 which is bolted as shown at 94 to the special pulleys 51 and 52.

While the stalks 11 vary in diameter, the sprouts 12 vary in size, and the pedicels 13 vary in length for any given diameter of stalk, the length of the pedicels and the size of the sprouts is in approximately the same relation. Thus, for any given diameter of stalk, the knives 86 will be held away from the hard, woody, shell 4 of the stalk by the stalk guides 89 and will be mounted such that the knives 86 engage the pedicel 13 initially at approximately the same relative point as illustrated in FIG. 3.

Although theoretically, very thin knives could cut through a pedicel leaving wafers like the leaves in a book, in actual practice, six relatively thick knives, rotated at very high speeds relative to the feed of the stalk make 50—60 cuts in a pedicel before it is severed, thus producing a complete milling out of the pedicel as shown in FIG. 3. The knives being at an angle to the longitudinal axis of the stalk, the last cut of the pedicel, producing severance of the sprout, is substantially along the line B (FIG. 3), is substantially tangent to the sprout and is substantially normal to the centerline of the pedicel. It is important that the combination of the stalk guide 89 and the spring mounting of the knives be such that a small variation in diameters of stalks may be accommodated in the same cutter head and that the stalk guide will bring the last cut or severance cut at substantially tangent to the sprouts. This enables the sprouts as they are severed to be packed with a minimum of further hand trimming of the individual sprouts.

Figure 1:
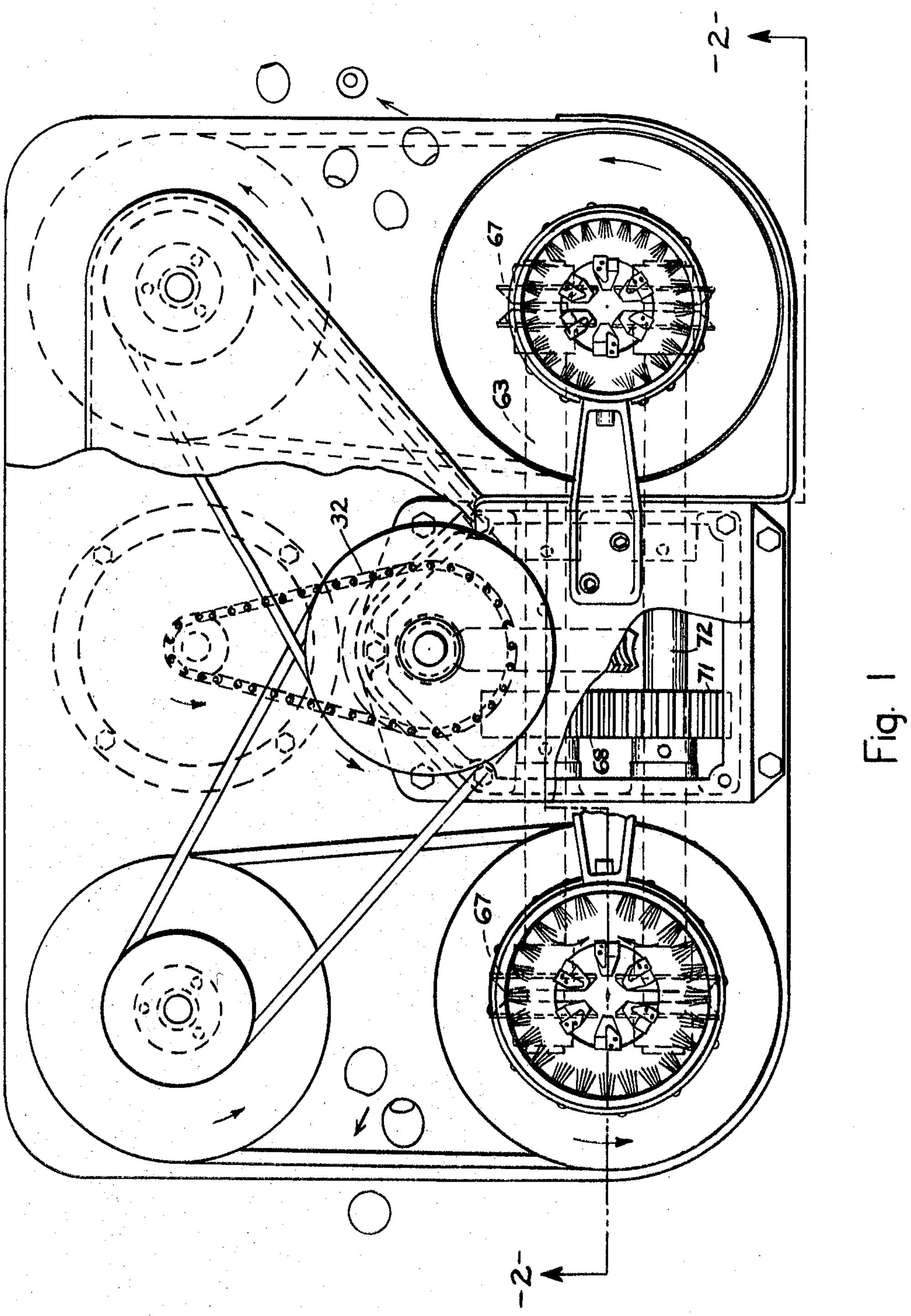
FIG. 1 is a top plan view of the machine of my invention with parts removed in order to show the drive for the machine.

As previously mentioned, and as will appear particularly from FIG. 3, high speed rotation of the knives causes a number of cuts in the pedicel. At a point prior to reaching the line B of FIG. 3, a sprout due to its weight is dangling and is liable to fall off prior to complete severance along the tangent line B. For the purpose of supporting the sprouts, a collar 101 which is preferably resilient, is screwed as shown at 102, to each of the guide rings 81 and 82. Fixed to the resilient collar ring 101 are a multiplicity of brushes 103, which in the position of the parts shown in FIG. 4, are depressed somewhat out of their normal horizontal position by the weight of the sprouts. As shown in FIG. 1, the brushes 103 extend in an angular ring so that all the sprouts extending around the stalk are supported until severance is completed along the line B.

Figure 7:
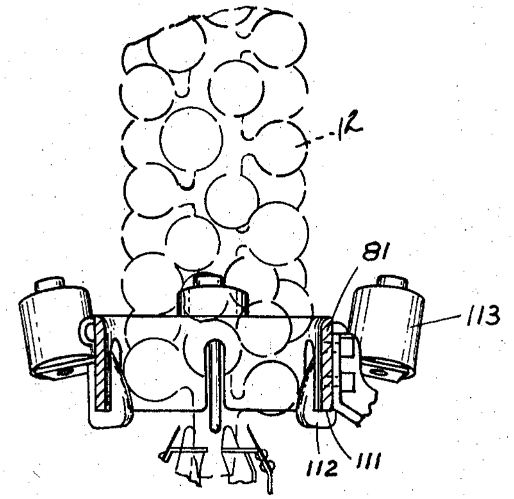
FIG. 7 is a partial view similar to FIG. 3 illustrating an alternative form of mechanism for supporting the sprouts on the stalk until severance is completed.

In FIG. 7, I have shown a modified form of support for the sprouts. In this modification cylinder 81 has a series of slots in its periphery extending upward from the lower edge 111 thereof. Extending through the slots are a plurality of pressure members or counterbalanced fins 112 which are hinged in the wall of the cylinder. Pressure members 112 carry at their outer ends counterweights 113. There is thus provided a ring of pressure members 112 which support the sprouts, the downward pressure of the sprouts being resisted by the counterweights 113.

One fact of particular importance is that all guiding, cutting, and holding elements, that is the guide rings 81, stalk guides 89 and cutting knives 86, are in a relatively narrow axial or longitudinal band with respect to the total length of the sprouts plant. Thus, the stalk of the plant is held at two axially or longitudinally spaced points, the mitre gears 67 or other gripping and feeding means and the stalk guides 89. The axial or longitudinal section of the stalk undergoing cutting is thus held parallel to the centerline or axis of the rotating knife head assembly. Cutting occurs adjacent to the plane of the upper support. Most sprout plants will have at least a slight bend in the stalk but, by reason of the close proximity of the guiding, cutting, and holding elements, and the relatively close spacing of the feeding means, plants go through the machine without being unduly forced toward one side or the other, thus not deviating greatly from the uniform severance desirable for even trimming of the pedicels from the individual sprouts. "The give" of the brushes 103 or the counterweighted pressure fins around the ring or cylinder 81 are important to accomplish proper severance of the pedicel. Of considerable importance is the fact that the stalk guides 89 are substantially in the plane of the cutting knives, substantially insuring that the cuts will be made in the proper plane and the final severing cut be made in the correct place substantially normal to the centerline of the pedicel and tangent to the sprouts.

I claim:

1. A method of removing sprouts by knife means from the plant stalk upon which they grow at the end of pedicels, said pedicels forming an acute angle with the axis of the stalk comprising:
   a. moving the stalk with the sprouts thereon relative to the knife means so that the pedicels on which the sprouts are supported are brought into cutting relation with the knife means;
   b. rotating the knife means in a circle to cut the pedicels to sever the sprouts from the stalk; and
   c. maintaining the rotating knife means substantially perpendicular to the centerline of the pedicels and in a cutting circle substantially concentric with the hard woody shell of the stalk and spaced a predetermined distance from said shell by supporting said knife means on flexible, radially movable stalk guides that cut through the semihard bark of said stalks and ride on the surface of the hard woody shell of the stalk, and spring biasing said guides toward said stalk.

2. The method according to claim 1 including the step of positioning said knife means with respect to said stalk guides such that said knife means sever said sprouts along a plane substantially tangent to said sprouts.

3. Apparatus for removing the sprouts from the plant stalk upon which they grow, said sprouts being supported on the end of pedicels that form an acute angle with said plant stalk, said apparatus comprising the combination of:
   a. knife means;
   b. means for gripping the stalk and for moving the stalk and the knife means, in sprout severing relation, relative to each other;
   c. means for rotating the knife means in severing relation to the sprouts;
   d. flexible guide means connected to said knife means and biased toward said stalk for cutting through the semihard bark of said stalk and for riding on and following the hard woody shell of said stalk for spacing said knife means a predetermined distance from the hard woody shell of said stalk; and
   e. means for holding said knife means substantially perpendicular to the centerline of the pedicels such that the sprouts are cut off in a plane substantially perpendicular to the centerline of said pedicels and substantially tangent to the sprouts.

4. In the method of severing sprouts from the plant stalk upon which they are supported, by rotating knife means, said sprouts being supported on the end of pedicels that extend at an acute angle to the plant stalk, the improvement comprising:
   severing said sprouts along a plane substantially tangent to the sprouts and substantially perpendicular to the pedicels on which the sprouts are supported; and
   said severing step including the step of maintaining the knife means a predetermined distance from the hard woody shell of the plant stalk, by supporting said knife means on guide means spring biased toward said stalk, and cutting through the semihard bark of said stalk with said guide means, said guide means riding on and following the hard woody shell of the plant.

5. In an apparatus for severing sprouts, each of which is supported on a pedicel that forms an acute angle with a plant stalk upon which said sprouts grow, including rotating knife means defining a central, circular, cutting opening, and feed means for moving the stalk and the knife means relative to each other, such that the stalk moves through said opening for cutting off the sprouts, the improvement comprising:
   means for holding said knife means spaced from the hard woody shell of the stalk and perpendicular to the centerline of the pedicels such that the sprouts are cut off along a plane substantially tangent to the sprouts and substantially perpendicular to the centerline of the pedicels; and
   said holding means including resilient guide means connected to said knife means and biased toward said stalk for cutting through the semihard bark of the stalk and for following the hard woody shell of the stalk to hold the knife means spaced a predetermined distance from the hard woody shell of the stalk.

6. Apparatus for removing sprouts from the stalk upon which they grow, said sprouts being supported on the end of pedicels that form an acute angle with said plant stalk said apparatus comprising the combination of:
   a. knife means;
   b. means for gripping the stalk and for moving the stalk and the knife means in sprout severing relation relative to each other;
   c. means for rotating the knife means in severing relation to the pedicels on which the sprouts are supported;
   d. means for holding the knife means substantially perpendicular to the centerline of the pedicels; and
   e. means for yieldingly mounting the knives spaced from the hard woody shell of the stalk, said mounting means including guide means connected to the knife means and biased toward the plant stalk, said guide means cutting through the semihard bark and riding on and following the hard woody shell of the stalk.